July 22, 1941.   C. G. OLSON   2,250,050
FASTENER UNIT AND METHOD OF ITS ASSEMBLY
Filed March 6, 1939   2 Sheets-Sheet 1
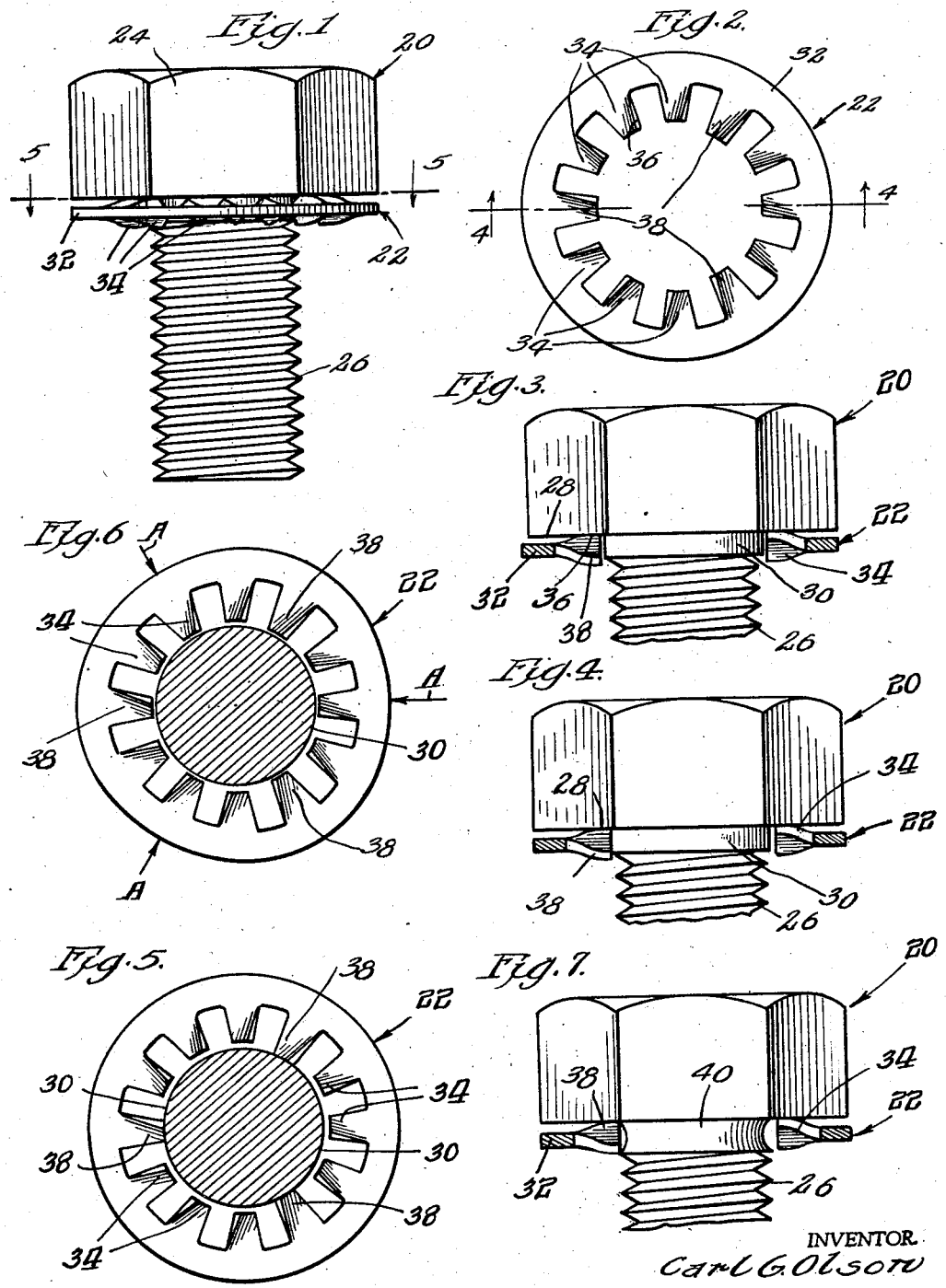
INVENTOR.
Carl G. Olson
BY Cox & Moore
ATTORNEYS.

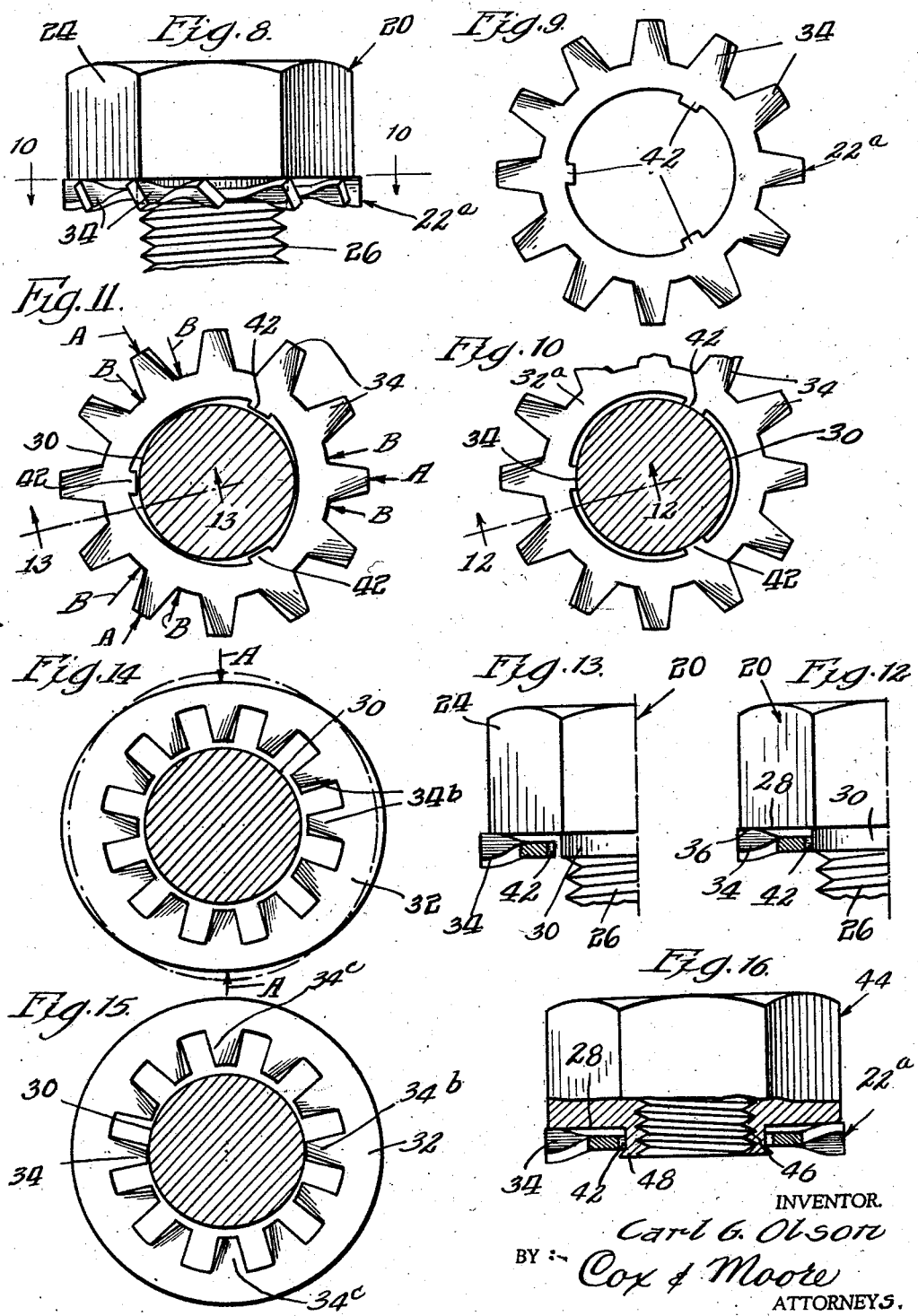

Patented July 22, 1941

2,250,050

UNITED STATES PATENT OFFICE 2,250,050

FASTENER UNIT AND METHOD OF ITS ASSEMBLY

Carl G. Olson, Chicago, Ill., assignor to Illinois Tool Works, Chicago, Ill., a corporation of Illinois Application March 6, 1939, Serial No. 260,015

6 Claims. (Cl. 10—73)

The present invention relates to preassembled threaded fasteners and lock washers, and more particularly to the combination, with the clamping surface of a rotary threaded clamping member, such as a screw head or nut, of a lock washer frictionally engaging a peripheral portion of the clamping member, and to methods for preassembling the said elements.

Preassembling lock washers and screws, or lock washers and nuts, prior to shipment thereof to the user contributes materially to the ease and speed with which the fasteners may be applied to the work, particularly in mass production industries where fasteners and lock washers are extensively employed. The manual assembly of a lock washer with a screw—for example, before application of the assembly to the work—necessitates the expenditure of considerable time and effort and results in considerable loss of lock washers because of the difficulty of manually manipulating such small articles. The present invention accordingly contemplates the provision of assemblies wherein the lock washer is permanently secured to the screw or nut against axial displacement so as to enable the shipment and delivery of such assemblies to the point of destination where they are to be applied to the work.

More specifically, the present invention contemplates assemblies of units, as specified above, wherein the inner portions of the lock washer frictionally bear against complementary peripheral portions of the screw shank or the complementary annular shoulder of the nut, so that these parts are permanently held together as a preassembled unit. While a lock washer may be forced frictionally into tight fitting position upon a complementary peripheral portion of a screw shank, this is in general impractical in large scale production methods, since to provide a forced fit between a portion of a screw shank— for example, a tightly embracing member— places a strict necessity for the maintenance of extremely close tolerances in manufacture of the parts, thus increasing the expense of production.

The present invention accordingly contemplates an assembly, as specified above, wherein the lock washer is provided with radially, inwardly extending gripping portions adapted to engage with a peripheral surface in the vicinity of the clamping surface of the screw or nut, said gripping portion or portions being spaced apart about the washer and separated by intermediate sections adapted to yield inwardly when compressed, in order to carry the gripping portions radially outwardly to release them from gripping relationship. In other words, the present invention contemplates the use of lock washers, the main body portion of which comprises a continuous convolution of spring stock, so that inward distortion of sections of the body causes the portions of the washer therebetween, and which are not subjected to inward distortion, to assume a somewhat elliptical outward curve.

It is an important object of the present invention to provide a lock washer assembly as above, wherein the outwardly yieldable portions carry lugs, or projections normally adapted to grippingly engage the fastener, which portions are separated by intermediate sections normally spaced from the fastener so as to permit the sections to be yieldably distorted inwardly without interference from the lock washer receiving portion of the fastener.

It is a further object of the present invention to provide an assembly, such as the foregoing, wherein the rotary threaded fastener is provided with a peripheral lock washer receiving portion having a greater diameter than the outer diameter of the thread, so that the washer is more or less freely movable axially over the threaded portion prior to application to the fastener.

A more specific object of the present invention is to provide a washer assembly as above having peripheral prongs for engaging a lock washer receiving portion of the fastener, and being provided with additional resilient locking prongs having locking teeth adapted to co-act with adjacent work surfaces to counteract retrograde rotation of the fastener, the locking prongs being spaced from the washer receiving portion of the fastener, so that they are free to co-act with adjacent work surfaces to produce a maximum locking action.

The present invention contemplates methods whereby the foregoing lock washers and peripheral surface portions in the vicinity of the clamping surface of a screw head or nut may be relatively shifted in an axial direction to a position to permit frictional gripping of complementary portions of the parts.

It is a further object of the present invention to provide a method, such as the above, wherein the lock washers and fasteners may be assembled after the thread has been cut or rolled upon the screw shank—for example, by temporary distortion of the washer, permitting it to pass relatively freely into position for permanent association with the fastener.

The foregoing and numerous other objects and advantages will be more apparent from the following detailed description when considered in connection with the following drawings, wherein—

Figure 1 is a side elevational view of a preassembled screw and lock washer made in accordance with the present invention;

Figure 2 is a plan view of the washer used in the assembly shown in Figure 1;

Figure 3 is a detailed elevational view of the preassembled screw and lock washer shown in Figure 1, the front half of the lock washer being broken away to more clearly illustrate the cooperation of the locking prongs with the screw head;

Figure 4 is a view substantially the same as Figure 3, but wherein the lock washer is broken away in a plane indicated by the line 4—4 of Figure 2;

Figure 5 is a sectional view taken on the line 5—5 of Figure 1;

Figure 6 is a view taken on the same plane as Figure 5, but showing the lock washer distorted so as to be released from tight fitting relationship upon the fastener;

Figure 7 is a view taken on the same plane as Figures 3 and 4 but showing a modified form of screw fastener;

Figure 8 is a side elevational view of a modified form of preassembled screw and lock washer;

Figure 9 is a plan view of a lock washer employed in the assembly shown in Figure 8;

Figure 10 is a sectional view taken on the line 10—10 of Figure 8;

Figure 11 is a view taken the same as Figure 10 but shows the lock washer distorted so as to be released from tight fitting relationship upon the fastener;

Figure 12 is a detailed side elevational view taken on the line 12—12 in Figure 10;

Figure 13 is a view taken on the line 13—13 in Figure 11;

Figures 14 and 15 are detailed sectional views similar to Figures 10 and 11 but showing a modified form of lock washer constructed in accordance with the present invention; and Figure 16 is a side elevational view of a nut and lock washer assembly embodying the principles of the present invention, with the front view of the lower portion of the assembly being broken away to more clearly illustrate the manner in which the parts are joined together.

Referring now to the drawings wherein like numerals have been employed to designate similar parts throughout the various figures, Figures 1 to 5, inclusive, illustrate the preassembling of a screw designated by the reference numeral 20 and a lock washer 22. The screw 20, of which a screw head forms a part, has a screw shank portion 26. The lower surface of the head extends outwardly from the screw shank portion to provide a clamping surface 28. The peripheral portion of the screw shank 26 in the vicinity of the clamping surface 28 is designed to frictionally receive complementary portions formed on the inner periphery of the washer body, which will be hereinafter more fully described. Thus the screw shank 26 is provided with a peripheral lock washer receiving portion designated generally by the reference numeral 30, which portion in the present embodiment is generally cylindrical in configuration.

The lock washer shown herein for the purpose of illustration includes an outer annular body 32 of spring stock having spaced along the inner margin thereof a plurality of locking members or prongs 34, which locking members or prongs are so twisted, warped, or deflected as to present oppositely disposed work engaging teeth or edges 36, which project beyond the bounding planes of the annular body 32 for locking engagement with adjacent work surfaces. It should be noted that the teeth 36 are adapted to make a line bite into the clamping surface of the screw head in order to obtain maximum locking efficiency.

Particular attention is directed to the fact that the locking prongs 34 are herein arranged in groups of three, extending from three equally spaced sections of the lock washer body. Intermediate of each of these groups extends a radial prong 38 which is similarly warped, deflected, or distorted to provide locking teeth. Attention is particularly directed to the fact, however, that the prongs or projections 38 extend to a point displaced inwardly in a radial direction beyond the inward extremities of the prongs 34. As a result of this construction, when the lock washer is associated with the screw shown in Figures 1 and 5, the relatively long prongs 38 project into tight fitting relationship with the complementary areas on the cylindrical surface 30. It will be obvious that the frictional engagement of the three prongs permanently secures the members together against relative axial displacement so that the lock washer is positioned with its locking teeth in operative relationship to the clamping surface 28.

The present invention contemplates the assembling of the foregoing lock washer upon the screw shank in the position shown, without the exercise of any appreciable axial stresses by virtue of the fact that the screw shank engaging prongs or lugs 38 may be radially distorted so that they move or yield outwardly of their normal position. Thus, as has been noted above, the sections of the lock washer intermediate of the locking projections 38 are so configurated that their innermost peripheral edges are located in the arc of a circle spaced a predetermined distance beyond the outer periphery of the washer receiving surface 30. If clamping forces are applied to the outer periphery of the washer at the points indicated by the letter A (Figure 6), the washer body will be distorted out of its normal circular formation and into somewhat elliptical formations. It should be particularly noted that the application of the forces is limited to points A intermediate of the locking projections 38, wherefore elliptical distortion of the adjacent portions is permitted by reason of the spacing provided between the extremities of the prongs 38 and the plane of the washer receiving surface 30.

Particular attention is directed to the fact that, as a natural result of this distortion of the inwardly yieldable sections, relative outward radial movement of the intervening portions of the lock washer body takes place. The outwardly yieldable portions comprise the projections 38 which are accordingly shifted radially outwardly. Thus, while, as clearly shown in Figure 5, the projections 38 are adapted to contact the washer receiving surface 30 in tight fitting relationship, under the influence of forces applied at the points A (see Figure 6), the prongs 38 are shifted out of tight fitting engagement for permitting axial displacement.

The present invention contemplates the utilization of the foregoing distortion of the washer in order to permit rapid and free application of lock washers to a fastener, and to this end the lock washer is first distorted to the position shown in Figure 6 by the application of stresses at three points A, whereupon the screw 20 is freely inserted until the peripheral washer receiving portion 30 resides in the plane of the washer 22. At this time the clamping or washer distorting forces are released to permit the washer to spring back to its original circular configuration, whereupon the projections 38 move into tight fitting clamping relationship with the screw shank to permanently secure the parts against axial displacement. It will be understood from the foregoing that the elasticity of the washer stock is such as to cause the washer to assume its original form, thus resulting in a firm securement to the screw shank.

Attention is directed to the fact that the present invention contemplates, in accordance with one preferred modification, the provision of a washer receiving fastener surface 30 having a diameter greater than the outer diameter of the thread upon the shank 26 for permitting the washer to be passed axially over the shank without contacting or damaging the thread convolutions. A construction of this character permits assembly of lock washer and screw after the threads have been extruded or cut upon the shank.

Also, attention is particularly directed to Figures 3 and 4 of the drawings, wherein it is shown that the locking prongs 34 are spaced from the washer receiving section 30 in the finished assembly and are, accordingly, free to co-act with the adjacent clamping surfaces to result in maximum locking efficiency. It should be noted also that the projecting prongs 38 are adapted to produce an additional tooth locking action through the agency of their opposed locking teeth 36 irrespective of the fact that these projections also serve to permanently assemble the parts.

In Figure 7 I have disclosed a screw and lock washer assembly similar in all respects to that disclosed in the foregoing figures, but having a lock washer receiving shank portion 40 providing an annular, outwardly facing recess or depression. As clearly shown in the figure, the clamping prongs or lugs 38 engage the curved or recessed face of the lock washer receiving portion 40. It will be seen that the holding portions or protuberances 38 are thus adapted to cooperate with screw shanks of widely varying shape and form for permanently holding the washer against axial displacement.

In Figures 8 and 10 I have disclosed the manner in which the screw 20 may be preassembled with a lock washer 22a, in which the body 32a is associated with a plurality of external locking members or prongs 34, as distinguished from the internal locking members or prongs 34 of Figures 1 to 7, inclusive. It is particularly important to note that the present lock washer is provided with internal extensions or protuberances 42, which, in the embodiment shown, are equally spaced about the inner periphery of the body 32a. As shown in Figure 10, the projections 42, when the washer is arranged in final assembled relationship on the screw, function to frictionally grasp the lock washer receiving portion 30 of the screw shank. Attention is particularly directed, however, to the fact that the projections 42 further function to space intermediate sections of the washer body 32 from the screw shank, the spacing being sufficient to permit the sections to yield appreciably inwardly under properly applied, opposed clamping forces.

From the foregoing it will be understood that the instant washer construction may be originally assembled in accordance with the principles heretofore set out, and more particularly by causing the sections of the washer between the holding prongs or protuberances 42 to be yieldably forced radially inwardly to cause the protuberances to move in an opposite radial direction. This function of the member is illustrated in Figure 11 wherein the washer of Figure 9 is disclosed in yieldably distorted form at the instant of its application over the screw shank. It should be noted that the gripping forces producing the yieldable distortion of the washer are applied substantially at the three points A. It will be seen that the application of force occurs at the extremity of certain of the locking prongs 34. It will be understood, however, that in the event application of distorting pressure to the prongs is deemed undesirable—for example, in instances where the prongs are incapable of receiving the necessary force without buckling—a substantially similar effect may be secured by applying equivalent forces along the lines B. Here, as in the foregoing embodiment, the yielding distortion of the lock washer body causes a plurality of somewhat elliptical curved formations, resulting in the bodily removal of the prongs or lugs 42 from the vicinity of the plane of the shank. While held in the position shown in Figure 11, the washer is freely applied axially over the shank to the position shown in Figure 8, and upon release of the holding forces, the washer body springs into its original position for permanently grasping the fastener.

Figures 10 and 12 illustrate the cooperative permanent frictional gripping between the holding prongs or projections 42 and the peripheral washer receiving landing 30, while Figures 11 and 13 show the relative separation of these members. After the assembly of the foregoing lock washer and screw, the locking prongs 34 reside in assembled position adjacent the clamping surface 28 with biting edges 36 available for interlocking action.

As illustrated in Figures 14 and 15, a modified form of assembly comprises a lock washer which cooperates with the fastener to frictionally grasp the latter at oppositely disposed peripheral points, and which, accordingly, may be deformed for application to the fastener by clamping forces applied at only two intermediate points. The washer assembly disclosed in Figure 15 shows the washer in approximately its normal position. It should be noted that the locking prongs 34 project inwardly from the body 32, but differ from the previously disclosed embodiments in that they are arranged in a line which is the locus of a point forming a closed elliptical curve, about the axis of the screw shank. As a result, the prongs designated by the reference numeral 34b extend most nearly to the central axis of the washer, while the adjacent prongs are spaced therefrom with a progressively increasing distance, until prongs 34c, which are the prongs farthest removed, are provided with a maximum spacing. The prongs 34b accordingly function to frictionally grasp the washer receiving portions of the fastener in final assembled position. Arrangement of the parts in this position is accomplished by merely applying opposed clamping forces to the washer body at the points A (Figure 14) to cause an elliptical distortion. The degree of distortion effected is clearly exemplified in Figure 14 by comparison of the outer peripheral position of the washer with its normal circular periphery, as illustrated by the dot-and-dash line. The elliptical distortion of the outer periphery, however, results in a corresponding displacement of the inner extremities of the locking prongs 34, so that the latter are brought out of their normal elliptical alinement. The prongs 34 yield outwardly as the intermediate prongs are forced inwardly. The resulting configuration of the prongs tends to correspond to the circular configuration of the peripheral surface 30 in preventing frictional interengagement.

It is important, of course, to note that the washer is at no time distorted beyond its elastic limit, and upon release of the clamping forces returns to the clamping position in Figure 15.

It will be obvious that the washers shown in Figures 14 and 15 may be further modified along the lines of the washer in Figure 2 to the extent that the prongs intermediate of the innermost projecting prongs 34b need not reside in a normally elliptical line, but may be all spaced the same distance from the plane of the screw shank. That is to say, where manufacturing methods render this construction more desirable, the locking prongs intermediate of the prongs 34b may all be arranged annularly, provided of course that their innermost extremities are spaced radially outwardly of the extremities of the grasping prongs 34b.

I have shown in Figure 16 the application of the present invention to an internally threaded fastener, wherefore it will be evident that the invention is equally applicable to threaded fasteners of both types. The clamping member or nut, which is designated generally by the numeral 44, is of conventional multi-sided design and provided at its clamping side with a lock washer retaining section 46. This section 46 extends axially beyond the clamping surface 28 of the nut, but preferably only a sufficient distance to insure the assembled retention of the lock washer 22a. The lock washer holding or retaining section in this embodiment has an outer cylindrical surface, although, as noted above, the configuration of the surface may be varied widely as to form. The lock washer 22a is of substantially identical form as that disclosed in Figure 9. It will be understood from the foregoing description that the projections 42 on the lock washer cooperate with the peripheral surface of the lock washer receiving section 46 to permanently retain the parts in position.

Attention is further directed to the fact that the lower extremity of the washer receiving section 46 is headed over or upset slightly as at 48 to additionally insure the positive retention of the washer in its axial position with respect to the nut. While it will be understood that for general purposes the cooperative frictional engagement of the washer and the peripheral receiving surface is sufficient to permanently retain the members in assembled position, nevertheless a headed over flange or burr 48 may sometimes be very readily formed in the case of fasteners of the instant type and cooperates to positively prevent disassembly under any conditions.

The application of clamping forces tending to radially displace predetermined sections of the washer body may be employed through the assistance of various devices or combination of devices. For example, the washer may be forced through an aperture having inwardly tapering projections opposite the points designated by the letter A or B in Figures 6, 11, and 14. The elliptical distortion of the washer shown in Figures 14 and 15 may be effected in a conventional vise, and it will be evident that the washer in Figure 6 may be similarly handled by use of a vise having three jaws actuable in planes which are spaced by equal angles. Such a vise or clamping device is exemplified by a chuck or collet as conventionally used for holding work in a lathe. In view of the fact that the present invention is not concerned with the specific form of clamping devices and the like which may be employed in practice, these devices are not particularly illustrated. It will suffice to say, however, that the invention contemplates the use of various forms of devices whereby my improved method of assembling washers of the present type may be practiced.

Attention is particularly directed to the fact that, while the present invention is applicable to practice in connection with relatively soft fasteners, nevertheless it may be employed in assembling lock washers upon relatively hard fasteners, for example, thread forming fasteners which are normally hardened for cutting complementary thread portions in a work piece. This results from the fact that the present washers are assembled by a method which contemplates the relatively free assembly of the parts. That is to say, there exists no necessity for causing the lock washer to shear, gouge, or exert any undesired directional engagement with the shank of the fastener, in order to experience tight fitting engagement of the parts. On the contrary, the permanent engagement of the parts is experienced only when the washer distorting forces are released to permit the clamping portions to exert a gripping force upon the complementary surfaces.

From the foregoing it will be apparent that my present invention provides a simple and expeditious method of securing lock washers and threaded clamping members in preassembled relation prior to shipment to the ultimate user. The frictional resistance set up between the inner marginal portion of the washers and the receiving surface of the fastener is sufficient to retain the parts in preassembled relationship without danger of unauthorized disassembly. It should be understood that the frictional engagement of the lock washer stock with the periphery of the screw shank is preferably just sufficient to retain the parts in proper assembled relation without interfering with the locking characteristics of the lock washer prongs or locking teeth. It is accordingly evident that, when the foregoing assemblies are tightened against the work, the embedding action of the teeth serves to insure against retrograde movement or loosening of the clamping member.

Attention is directed to the fact that the structural arrangement of the lock washers described herein is such as to permit assembly upon complementary fasteners, even though the shank portions of such fasteners may vary slightly in diameter. That is to say, the distortion of the lock washer to increase what is, in effect, the diameter of the inner peripheral portion engageable with the screw shank, is permissible of wide variation in accordance with the resiliency and the structural conformation of the washer. Any washer, accordingly, may be readily constructed for easy assembly and engagement with a fastener, the receiving portions of which vary within fairly wide tolerances. This invention therefore enables a lock washer to be assembled upon shank portions that may vary in accordance with normal manufacturing tolerances.

The term "effective diameter" as used in the present specification and claims is defined as that diameter determined by the distance between the innermost extremity of the inwardly extending portions which cooperate with the shank of the associated fastener for maintaining permanent assembly thereof.

Obviously the invention is not limited to the specific structural arrangement disclosed herein, but is capable of other modifications and changes without departing from the spirit and scope of the present invention.

Having thus described my invention, what I claim as new and desire to secure by Letters Patent is:

1. The method of assembling a continuous, annular lock washer and fastener which comprises radially yieldably distorting a lock washer inwardly at spaced peripheral points only, to cause intermediate portions of the lock washer to shift in an opposite radial direction for increasing the effective internal diameter of the washer, applying said lock washer axially of a fastener while so distorted, and releasing said distortion to permit said intermediate portions to return to their original position for grippingly engaging the fastener in tight fitting relationship.

2. The method of assembling a continuous annular lock washer having spaced peripheral fastener engaging portions upon a rotary threaded fastener having a clamping surface extending outwardly from the threaded portion and a lock washer receiving portion extending axially beyond the clamping surface thereof, which comprises causing portions of said washer located between said fastener engaging portions to yield radially inwardly for shifting said fastener engaging portions in an opposite radial direction and increasing the effective internal diameter of the washer, applying said lock washer axially of the fastener and releasing said forces to permit said fastener engaging portion to move to fastener gripping position for permanently securing the parts against axial displacement.

3. The method of assembling a continuous, annular lock washer having inner peripheral projections and fastener having a peripheral lock washer receiving portion which comprises radially yieldably distorting said lock washer by forces applied at spaced peripheral points located between said projections, to shift said projections of the lock washer in an opposite radial direction for increasing the effective internal diameter of the washer, applying said lock washer axially of a fastener while so distorted, and releasing said distortion to permit said projections to return to fastener gripping position for grippingly engaging the fastener in tight fitting relationship.

4. The method of telescopically assembling a rotary clamping fastener having a peripheral lock washer receiving shank portion extending axially beyond the clamping side thereof and a lock washer presenting a continuous annular body of spring stock with locking teeth formed integral therewith and having an effective internal diameter normally less than the diameter of a section of the shank periphery positioned axially beyond and in the proximity of said clamping side, which consists in telescopically associating the lock washer and fastener, subjecting the body of the lock washer to radial strain within the elastic limit of the washer stock, said radial strain being directed so as to increase the said effective internal diameter of the washer as said washer and section of the shank periphery are telescoped, and then releasing said body strain so as to cause said washer to approximate its original internal diameter and thus co-act with said peripheral lock washer receiving shank portion in securing said lock washer against axial displacement.

5. The method of telescopically assembling a rotary clamping fastener having a peripheral lock washer receiving shank portion extending axially beyond the clamping side thereof and a lock washer presenting a continuous inner annular body of spring stock with locking teeth provided along the external margin thereof and having an effective internal diameter normally less than the diameter of a section of the shank periphery positioned axially beyond and in the proximity of said clamping side, which consists in telescopically associating the lock washer and fastener, subjecting said internal annular lock washer body to radial strain within the elastic limit of the lock washer stock, said radial strain being directed to increase the said effective internal diameter of the washer as said washer and section of shank periphery are telescoped, and then releasing said body strain so as to cause said washer to approximate its original internal diameter and thus co-act with said peripheral lock washer receiving shank portion in securing said lock washer against axial displacement.

6. The method of telescopically assembling a rotary clamping fastener having a peripheral lock washer receiving shank portion including a shoulder in the vicinity of but axially spaced from the clamping side of the fastener and a lock washer presenting a continuous annular body of spring stock with locking teeth formed integral therewith and having an effective internal diameter normally less than the diameter of said shoulder, which consists in telescopically associating the lock washer and fastener, subjecting the body of the lock washer to radial strain within the elastic limit of the washer stock, said radial strain being directed so as to increase the said effective internal diameter of the washer as said washer and shoulder are telescoped, and then releasing said body strain so as to cause said washer to approximate its original internal diameter and thus co-act with said shoulder in securing the lock washer against axial displacement.

CARL G. OLSON.